I. N. ANDERSON.
NUT LOCK.
APPLICATION FILED JAN. 23, 1909.
928,577.
Patented July 20, 1909.
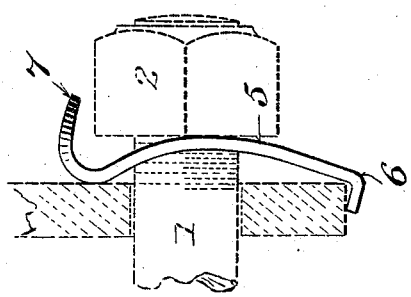
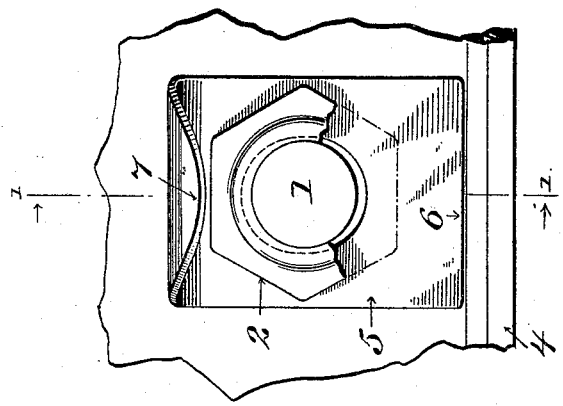
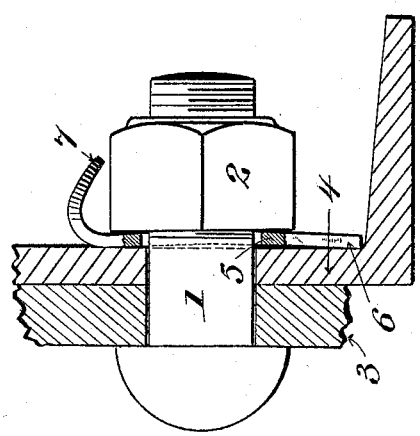

UNITED STATES PATENT OFFICE.

INGAR N. ANDERSON, OF RACINE, WISCONSIN, ASSIGNOR OF ONE-HALF TO FERDINAND J. JOHNSON, OF RACINE, WISCONSIN.

NUT-LOCK.

No. 928,577.  Specification of Letters Patent.  Patented July 20, 1909.

Application filed January 23, 1909. Serial No. 473,784.

*To all whom it may concern:*

Be it known that I, INGAR N. ANDERSON, a citizen of the United States, and resident of Racine, in the county of Racine and State of Wisconsin, have invented certain new and useful Improvements in Nut-Locks; and I do hereby declare that the following is a full, clear, and exact description thereof.

The object of my invention is to provide simple, durable and effective nut-locks, to be utilized in various structures subject to vibrations, the invention consisting in certain peculiarities of construction and combination of parts as hereinafter fully described with reference to the accompanying drawings and subsequently claimed.

In the drawings: Figure 1 represents a sectional elevation of a nut-lock embodying the features of my invention, which nut-lock is shown applied to a bolt and nut employed to secure an angle-iron and flat member together, the section being indicated by line 1—1 of Fig. 2; Fig. 2, a front elevation of the same, and Fig. 3, a detached view of the locking member in the position it assumes when not in use, which locking member as shown consists primarily of a dished washer and may in some instances be provided with a foot.

Referring by numerals to the drawings, 1 indicates a threaded bolt provided with the usual nut 2. The bolt is fitted through apertures in a metallic member 3 and an angle-iron section 4, and between the outer face of which section and the nut is fitted an apertured rectangular spring-washer 5. The bottom edge 6 of the washer lies parallel with the lower flange of the angle-iron section, which flange prevents said washer from rotating.

In instances where members are secured having no flanges, the bottom edge 6 of the washer, as shown in Fig. 3, may be provided with a right-angle foot, which foot is adapted to overlap the edge of the adjacent member, as indicated by dotted lines, the foot in this case serving to prevent said washer from turning when opposed by the nut. The top edge of the washer is preferably arch-shaped and is bent over to form an overhanging lip 7, which lip projects into the path of travel of the corners of the nut, when the latter is in its seated position, and thereby locks said nut against turning.

As shown in Fig. 3, when the spring-washer is not subjected to strain, it is bowed outwardly from top to bottom in such manner that only its upper and lower edges will touch a flat surface. In this position it will be observed that the overhanging lip 7 extends out approximately at a right-angle to a vertical line which would contact with the top and bottom edges of the washer. Consequently when the nut is run upon the threaded shank of the bolt, its corners will pass freely under the lip, until such time as the washer has been compressed sufficiently to cause said lip to draw downward. The corners of the nut will then engage the arch-shaped edge of the lip at each turn and spring the same upwardly, the force required to spring said lip being proportionately increased with each revolution of said nut until such time as the washer is flattened, it being understood that the angle of the aforesaid lip is constantly changing so as to bring the edges of the latter closer to the face of the nut, which action is due to the flattening out of the bowed body-portion of the washer.

I claim:

The combination of a bolt and its nut, a washer fitted under the nut, the washer comprising a normally bowed body-portion, and having a normally recurved lip extending from one of the edges of the bowed portion, the lip being provided with an arch-shaped edge, the central portion of which arch-shaped edge is brought into the path of travel of the nut corners as said nut is run upon the bolt to cause a flattening of the washer upon the resisting surface to provide for effecting a locking engagement of said central portion of the washer-edge with a face of the nut, and means in connection with one edge of the washer, whereby the latter is held against rotation.

In testimony that I claim the foregoing I have hereunto set my hand at Racine, in the county of Racine and State of Wisconsin in the presence of two witnesses.

INGAR N. ANDERSON.

Witnesses:
M. WILSON MILLY,
J. E. ROWLANDS.